(12) United States Patent
Zhang et al.

(10) Patent No.: US 12,506,199 B1
(45) Date of Patent: Dec. 23, 2025

(54) BATTERY CELL AND BATTERY

(71) Applicant: ZHUHAI COSMX BATTERY CO., LTD., Zhuhai (CN)

(72) Inventors: Jiayu Zhang, Zhuhai (CN); Hongxiang Chen, Zhuhai (CN); Lanxing Wu, Zhuhai (CN); Boxiang Lin, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 0 days.

(21) Appl. No.: 19/201,895

(22) Filed: May 7, 2025

(30) Foreign Application Priority Data

Jun. 21, 2024 (CN) .......................... 202410808259.2

(51) Int. Cl.
| | |
|---|---|
| *H01M 50/105* | (2021.01) |
| *H01M 4/38* | (2006.01) |
| *H01M 4/587* | (2010.01) |
| *H01M 4/70* | (2006.01) |
| *H01M 10/04* | (2006.01) |
| *H01M 50/131* | (2021.01) |
| *H01M 4/02* | (2006.01) |

(52) U.S. Cl.
CPC ......... *H01M 50/131* (2021.01); *H01M 4/386* (2013.01); *H01M 4/587* (2013.01); *H01M 4/70* (2013.01); *H01M 10/0431* (2013.01); *H01M 50/105* (2021.01); *H01M 2004/021* (2013.01); *H01M 2004/027* (2013.01)

(58) Field of Classification Search
CPC ................. H01M 50/105; H01M 4/70; H01M 2004/027; H01M 2004/021
See application file for complete search history.

(56) References Cited

U.S. PATENT DOCUMENTS

| | | | |
|---|---|---|---|
| 2023/0080725 A1* | 3/2023 | Lee ................... | H01M 10/0525 429/82 |
| 2023/0123455 A1* | 4/2023 | Hu ........................ | H01M 4/364 429/231.95 |
| 2024/0047791 A1* | 2/2024 | Lee ...................... | H01M 10/052 |
| 2024/0079689 A1* | 3/2024 | Taniuchi ........... | H01M 50/1243 |
| 2024/0322309 A1* | 9/2024 | Chen ................... | H01M 50/249 |
| 2024/0421391 A1* | 12/2024 | Hwang ............... | H01M 50/133 |

* cited by examiner

*Primary Examiner* — Yoshitoshi Takeuchi
(74) *Attorney, Agent, or Firm* — K&L Gates LLP

(57) ABSTRACT

The present disclosure provides a battery cell and a battery, wherein the battery cell comprises: a battery cell body and a film casing, the film casing being wrapped around the exterior of the battery cell body, the battery cell body comprising a negative electrode plate, the negative electrode plate comprising a first current collector and a first coating, the first coating comprising graphite, the film casing having a plurality of vertices, each vertex comprising a first edge corner portion, a second edge corner portion, and a third edge corner portion intersected; the film casing and the battery cell body satisfy: $750 \leq (abc)/(W_a \times W_b \times W_c) \leq 90000$. The disclosure solves the technical problem that film casings are prone to fracture and damage.

10 Claims, 2 Drawing Sheets

BATTERY CELL AND BATTERY

CROSS-REFERENCES TO RELATED APPLICATIONS

This disclosure claims priority to Chinese Patent Application No. 202410808259.2, entitled with "BATTERY CELL AND BATTERY", filed with the China National Intellectual Property Administration on Jun. 21, 2024, the content of which is incorporated herein by reference.

TECHNICAL FIELD

The present disclosure relates to the field of battery technology, and particularly to a battery cell and a battery.

BACKGROUND OF THE INVENTION

With the development of new energy technologies, there is a desire for electronic products to be lighter and more compact, which places higher demands on the energy density of batteries. There is an urgent need for lithium-ion batteries with high energy and long cycle life.

In the pursuit of energy density, commonly adopted methods comprise increasing the specific capacity of the main material, reducing the thickness of auxiliary materials, compressing the volume of the film casing, and reducing the volume of the jelly roll and the gap between the jelly roll and the film casing. However, during the process of reducing the volume of the jelly roll and the film casing, the electrode plate may exhibit a certain degree of extension, meaning that the dimensions of the electrode plate increase. The extension of the electrode plate itself may interfere with the film casing that wraps the jelly roll. During the charge and discharge cycles of the battery, this can easily cause the film casing to crack, affecting the service life of the battery.

Therefore, there is an urgent need to solve the technical problem that the film casing is prone to cracking and damage, which affects the service life of the battery.

BRIEF SUMMARY OF THE INVENTION

The present disclosure provides a battery cell and a battery to solve the technical problem that the film casing is prone to cracking and damage, which affects the service life of the battery.

In order to achieve the above objective, the present disclosure provides a battery cell comprising: a battery cell body and a film casing, wherein the film casing is wrapped around the outer part of the battery cell body, the battery cell body comprises a negative electrode plate, the negative electrode plate comprises a first current collector and a first coating, the first coating comprises graphite, the film casing has a plurality of vertices, and each vertex comprises a first edge corner portion, a second edge corner portion, and a third edge corner portion intersected; the film casing and the battery cell body satisfy a follow condition: $750 \leq (abc)/(Wa \times Wb \times Wc) \leq 90000$;

wherein, $Wa = Ka/H$; $Wb = Kb/H$; $Wc = Kc/H$, Ka is a reversal parameter of the first edge corner portion; Kb is a reversal parameter of the second edge corner portion; Kc is a reversal parameter of the third edge; H is a punching depth of the film casing; a is an OI value of the graphite in the first coating; b is a tensile strength of the first current collector; c is a thickness of the first current collector.

The battery cell provided by the present disclosure takes into account the ductility of the negative electrode plate during the design of the vertices of the film casing, so that the vertices better match the occupied space of the battery cell body, increases the volume of the film casing, and reduces stress concentration at the vertices. During the charge and discharge cycles of the battery cell, the problem of corner cracks at the vertices is reduced, the safety performance of the battery cell is improved, and the energy density of the battery can also be improved.

In one possible embodiment, the OI value a of the graphite in the first coating, the tensile strength b of the first current collector, and the thickness c of the first current collector satisfy a follow condition: $20 \leq a^2bc/10000$.

In one possible embodiment, the film casing comprises a top wall and a plurality of side walls connected to the edges of the top wall, and the plurality of side walls comprise a first side wall and a second side wall adjacent to each other. The connection position between the top wall and the first side wall forms the first edge corner portion, the connection position between the top wall and the second side wall forms the second edge corner portion, and the connection position between the first side wall and the second side wall forms the third edge corner portion.

Wherein, the ratio Wa of the reversal parameter of the first edge corner portion to the punching depth of the film casing, the ratio Wb of the reversal parameter of the second edge corner portion to the punching depth of the film casing, and the ratio Wc of the reversal parameter of the third edge corner portion to the punching depth of the film casing also satisfy a follow condition:

$$Wa \leq Wc, Wb \leq Wc, 1 \leq Wa \leq 8, 1 \leq Wb \leq 8, 1 \leq Wc \leq 8.$$

In one possible embodiment, the first coating further comprises a silicon-based material, and the ratio of the weight S1 of the silicon-based material to the total weight S2 of the first coating satisfies a follow condition: $0 \leq S1/S2 \leq 20\%$.

In one possible embodiment, the OI value a of the graphite in the first coating satisfies a follow condition: $8 \leq a \leq 30$.

In one possible embodiment, the tensile strength b of the first current collector satisfies a follow condition: $300 \text{ MPa} \leq b \leq 700 \text{ MPa}$.

The thickness c of the first current collector satisfies a follow condition: $1 \text{ μm} \leq c \leq 15 \text{ μm}$.

In one possible embodiment, the thickness c of the first current collector satisfies a follow condition: $3 \text{ μm} \leq c \leq 7 \text{ μm}$.

In one possible embodiment, the silicon-based material in the first coating comprises at least one silicon-oxygen material, and the chemical formula of the silicon-oxygen material is $MySiOx$, where $0 \leq y \leq 4$, $0 \leq x \leq 4$, and M comprises at least one of Li, Mg, Ti, and Al.

In one possible embodiment, the punching depth H of the film casing during the stamping process is 2 mm to 5.5 mm.

The present application also provides a battery comprising a housing and the above-described battery cell, the battery cell being disposed within the housing.

The battery cell and battery provided by the present disclosure can effectively control the content of silicon material by controlling S1/S2, avoiding excessive elongation of the negative electrode plate due to excessive content of silicon material, enabling the battery to balance energy while also controlling the elongation of the negative electrode plate within a reasonable range and reducing the occurrence of corner crack at the vertex 11.

In addition to the technical problems solved by the embodiments of the present disclosure, the technical features constituting the technical solutions, and the beneficial effects brought by these technical features described above, other technical problems that can be solved by the battery cell and battery provided by the embodiments of the present disclosure, other technical features included in the technical solutions, and the beneficial effects brought by these technical features will be further described in detail in the specific embodiment.

BRIEF DESCRIPTION OF THE DRAWINGS

In order to more clearly illustrate the technical solutions in the embodiments of the present disclosure or the prior art, the drawings to be used in the description of the embodiments or the prior art will be briefly introduced below. Obviously the drawings described below are some embodiments of the present disclosure, and for those of ordinary skill in the art, other drawings can be obtained based on these drawings without creative efforts.

REFERENCE LIST

10—film casing; 11—vertex; 12—first edge corner portion; 121—first transition fillet; 13—second edge corner portion; 131—second transition fillet; 14—third edge corner portion; 141—third transition fillet; 15—first side wall; 16—second side wall; 17—top wall; 20—negative electrode plate; 21—first current collector; 22—first coating.

DETAILED DESCRIPTION OF THE INVENTION

To make the purpose, technical solutions, and advantages of the present disclosure clearer, the technical solutions of the present disclosure will be clearly and completely described below with reference to the drawings of the present disclosure. Obviously, the described embodiments are a part of the embodiments of the present disclosure, rather than all of the embodiments. All other embodiments obtained by those skilled in the art without creative efforts based on the embodiments of the present disclosure fall within the scope of protection of the present disclosure.

According to the analysis of the metal tensile stress-strain principle, when the tensile stress/strain of the aluminum-plastic film passes through the plastic deformation stage and reaches the peak tensile strength, fracture occurs.

During the process of reducing the volume of the jelly roll and the film casing, it is found that the electrode has a certain proportion of elongation in the three directions of length, width, and thickness. The elongation of the electrode itself interferes with the film casing. During the cycle, the breathing effect compresses the film casing. According to the analysis of the metal tensile stress-strain principle, when the tensile stress/strain of the aluminum-plastic film passes through the plastic deformation stage and reaches the peak tensile strength, fracture occurs.

Generally, the vertex of the film casing is prone to damage. The present application provides a battery cell with different elongation batteries matched with different corner space designs, making the space at the circular corner of the film casing more compatible with the jelly roll space, ensuring safety performance while improving energy density and effectively reducing the problem of damage at the vertex.

Figure 1:
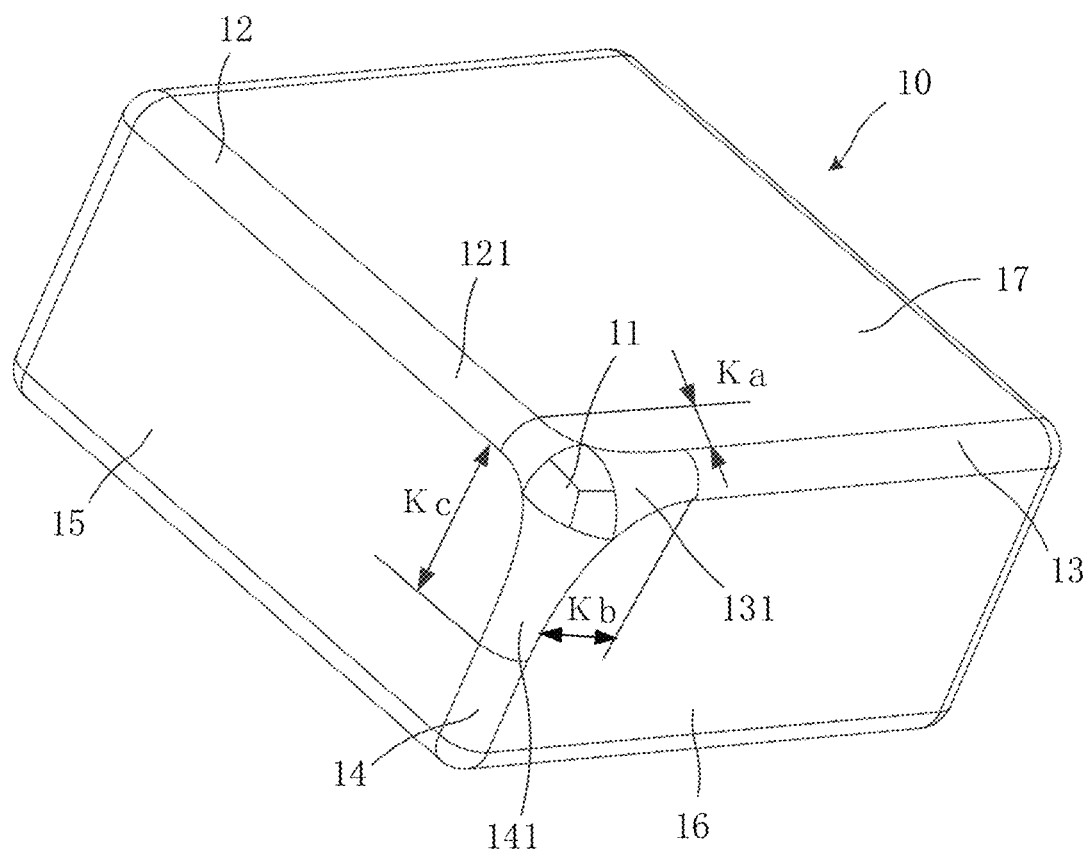
FIG. 1 is a three-dimensional schematic diagram of the film casing of the battery cell provided by the embodiment of the present disclosure.
Figure 3:
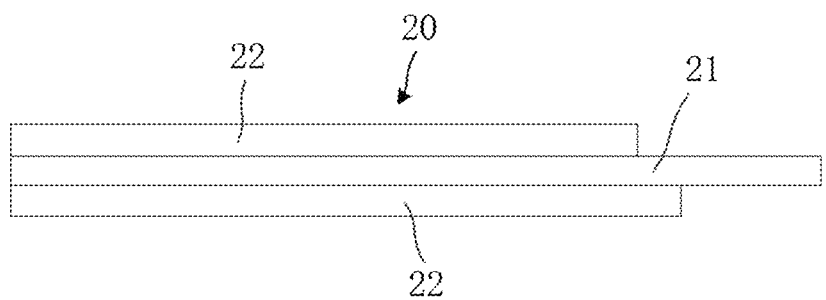
FIG. 3 is a structural schematic diagram of the negative electrode plate of the battery cell provided by the embodiment of the present disclosure.

The present disclosure provides a battery cell, comprising: a battery cell body and a film casing 10, the film casing 10 being wrapped around the exterior of the battery cell body, the battery cell body comprising a negative electrode plate 20, with reference to FIGS. 1 and 3, the negative electrode plate 20 comprising a first current collector 21 and a first coating 22, the first coating 22 comprising graphite, the film casing 10 having a plurality of vertices 11, each vertex 11 comprising a first edge corner portion 12, a second edge corner portion 13, and a third edge corner portion 14 intersected; the film casing 10 and the battery cell body satisfying a follow condition: $750 \leq (abc)/(Wa \times Wb \times Wc) \leq 90000$;

wherein, Wa=Ka/H; Wb=Kb/H; Wc=Kc/H, Ka being a reversal parameter of the first edge corner portion 12; Kb being a reversal parameter of the second edge corner portion 13; Kc being a reversal parameter of the third edge corner portion 14; H being a punching depth of the film casing 10; a being an OI value of the graphite in the first coating 22; b being a tensile strength of the first current collector 21; c being a thickness of the first current collector 21.

The battery cell provided by the present disclosure considers the ductility of the negative electrode plate 20 during the design of the vertex 11 of the film casing 10, making the vertex 11 more compatible with the occupied space of the battery cell body, increasing the volume of the film casing 10 while reducing stress concentration at the vertex 11. During the charge-discharge cycle of the battery cell, the problem of corner cracks at the vertex 11 is reduced, the safety performance of the battery cell is improved, and the energy density of the battery can also be improved.

Changes in the tensile strength b of the first current collector 21, the thickness c of the first current collector 21, and the OI value a of the graphite in the first coating 22 affect the ductility of the first coating 22. Changes in Wa, Wb, and Wc affect the spatial volume of the film casing 10 at the vertex 11. By controlling $(abc)/(Wa \times Wb \times Wc)$ within a certain range, the ductility of the negative electrode plate 20 and the space of the film casing 10 are more compatible, greatly reducing the problem of corner cracks at the vertex 11 of the battery cell.

In this embodiment, the film casing 10 may be an aluminum-plastic film casing, and the first current collector 21 is made of copper foil.

In one possible embodiment, the first coating 22 comprises any one or more of artificial graphite, natural graphite, mesophase carbon microbeads, soft carbon, hard carbon, organic polymer compound carbon, lithium titanate, silicon oxide, and silicon carbon.

In one possible embodiment, the OI value a of the graphite in the first coating 22, the tensile strength b of the first current collector 21, and the thickness c of the first current collector 21 satisfy a follow condition: $20 \leq a^2 bc/10000$. This is to enable the first current collector 21 to have a certain ability to reduce the ductility of the first coating 22, thereby effectively reducing the ductility of the negative electrode plate 20 during the charge-discharge process, reducing the problem of corner cracks at the vertex 11, improving the safety performance of the battery cell, and also improving the energy density of the battery.

For example, the value of $a^2 bc/10000$ can be 20, 25, 30, 42, 50, etc.

In one possible embodiment, the film casing 10 comprises a top wall 17 and a plurality of side walls connected to the edges of the top wall 17. The plurality of side walls comprise adjacent a first side wall 15 and a second side wall 16. The connection position between the top wall 17 and the first side wall 15 forms the first edge corner portion 12, the connection position between the top wall 17 and the second side wall 16 forms the second edge corner portion 13, and the connection position between the first side wall 15 and the second side wall 16 forms the third edge corner portion 14.

The ratio of the reversal parameter of the first edge corner portion 12 to the punching depth of the film casing 10 is Wa; the ratio of the reversal parameter of the second edge corner portion 13 to the punching depth of the film casing 10 is Wb; and the ratio of the reversal parameter of the third edge corner portion 14 to the punching depth of the film casing 10 is Wc; Wa, Wb and Wc also satisfy a follow condition: Wa≤Wc, Wb≤Wc, 1≤Wa≤8, 1≤Wb≤8, 1≤Wc≤8.

In one possible embodiment, Wa can be 1, 2, 3, 4, 5, 5.5, 6, 7, or 8.

In one possible embodiment, Wb can be 1, 2, 3, 4, 5, 5.5, 6, 7, or 8. In one possible embodiment, Wc can be 1, 2, 3, 4, 5, 5.5, 6, 7, or 8.

The reversal parameter is an input parameter for generating the vertex 11 of the film casing 10 in the 3D modeling software SolidWorks. Changes in the reversal parameter directly affect the surface shape of the vertex 11.

Figure 2:
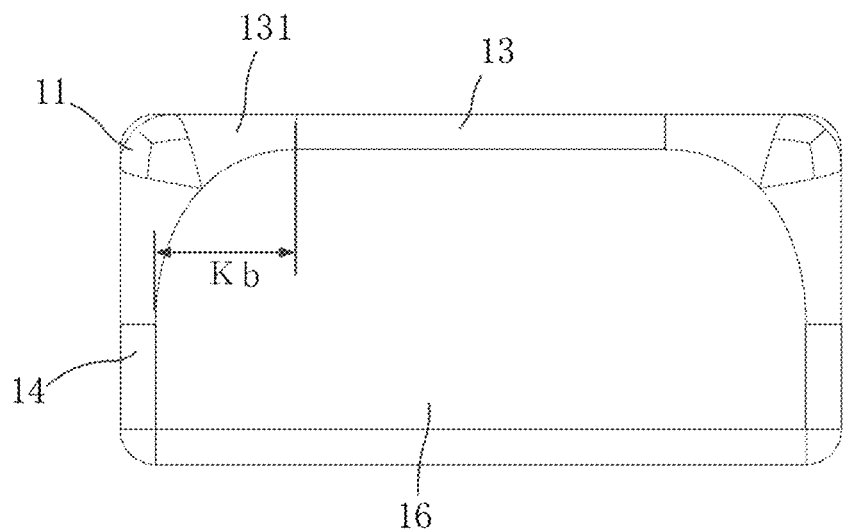
FIG. 2 is a front view of the film casing of the battery cell provided by the embodiment of the present disclosure.

For a better understanding of the reversal parameter, with reference to FIGS. 1 and 2, a change in the reversal parameter Ka of the first edge corner portion 12 is reflected in the model as a change in the length of the first transition fillet 121 connecting the vertex 11 to the first edge corner portion 12. The reversal parameter Ka of the first edge corner portion 12 is the distance from the end of the top wall 17 near the second edge corner portion 13 to the end of the first transition fillet 121 away from the vertex 11.

A change in the reversal parameter Kb of the second edge corner portion 13 is reflected in the model as a change in the length of the second transition fillet 131 connecting the vertex 11 to the second edge corner portion 13. The reversal parameter Kb of the second edge corner portion 13 is the distance from the end of the second side wall 16 near the third edge corner portion 14 to the end of the second transition fillet 131 away from the vertex 11.

A change in the reversal parameter Kc of the third edge corner portion 14 is reflected in the model as a change in the length of the third transition fillet 141 connecting the vertex 11 to the third edge corner portion 14. The reversal parameter Kc of the third edge corner portion 14 is the distance from the end of the first side wall 15 near the first edge corner portion 12 to the end of the third transition fillet 141 away from the vertex 11.

If the reversal parameter is too small, it will cause the vertex 11 to form a sharp angle, resulting in stress concentration at the vertex 11, which is prone to cracking. If the reversal parameter is too large, it will occupy the corner space, reducing the space of the film casing 10 at the vertex 11, which is not conducive to providing the energy density of the battery.

In this example, the film casing 10 is in the shape of a cube, the top wall 17 is in the shape of a rectangle, there are 4 side walls, and the side walls are also in the shape of a rectangle. The four side walls are respectively connected to the four side edges of the top wall 17.

In this example, the first edge corner portion 12, the second edge corner portion 13, and the third edge corner portion 14 are all arc edges.

In one possible embodiment, the first coating 22 further comprises a silicon-based material, and the ratio of the weight S1 of the silicon-based material to the total weight S2 of the first coating 22 satisfies a follow condition: 0≤S1/S2≤20%.

In the negative electrode plate 20, the first coating 22 is attached to the surface of the first current collector 21 through a binder layer. The first coating 22 comprises graphite and silicon material. During the charging and discharging process, the silicon material will be embedded into the graphite, causing the first coating 22 to extend. Under the adhesive force of the binder layer, the first current collector 21 will inhibit the extension of the first coating 22. By controlling S1/S2, this application can effectively control the content of silicon material, avoid excessive extension of the negative electrode plate 20 due to excessive content of silicon material, enable the battery to balance energy, and also control the extensibility of the negative electrode plate 20 within a reasonable range, reducing the problem of corner crack at the vertex 11. By adding materials, the capacity of the battery can be improved, and the energy density of the battery can be significantly increased.

In one possible embodiment, the OI value a of the graphite in the first coating 22 satisfies a follow condition: 8≤a≤30. For example, the OI value a of the graphite can be 8, 10, 15, 17.4, 20, 25, 30, etc.

The OI value a of the graphite reflects the intercalation and deintercalation rate of lithium ions on the surface of the negative electrode plate 20. Specifically, the OI value of the graphite is the formation time of the oxide film on the surface of the negative electrode plate 20 during the charging and discharging process of the lithium-ion battery, and it is a parameter indicating the degree of ordering of graphite layers in the graphite material.

It is easy to understand that the smaller the OI value a of the graphite in the first coating 22, the greater the extension of the first coating 22, and the more likely it is to cause the problem of corner crack at the vertex 11. If the OI value a of the graphite is too large, it will cause excessive thickness expansion of the first coating 22. This is because the first coating 22 is doped with silicon material. During the charging and discharging of the battery, the silicon material will be embedded into the graphite, causing the graphite to expand in volume. The more silicon material, the greater the extension of the first current collector 21, and the more likely it is to cause the problem of corner crack. Therefore, this application makes 8≤a≤30, which can control the extension of the negative electrode plate 20 within a reasonable range.

In one possible embodiment, the tensile strength b of the first current collector 21 satisfies a follow condition: 300 MPa≤b≤700 MPa.

In this application, the tensile strength b of the first current collector 21 is higher than that of the existing first current collector 21. It is easy to understand that increasing the tensile strength b of the first current collector 21 will improve the inhibitory effect of the first current collector 21 on the extension of the first coating 22, and prevent the problem of the first coating 22 breaking and peeling off due to excessive expansion.

The tensile strength of the first current collector 21 can be achieved, for example, by changing the production process of the first current collector 21. In one possible embodiment, the tensile strength b of the first current collector 21 can be, for example, 300 MPa, 330 MPa, 380 MPa, 400 MPa, 510 MPa, 590 MPa, 600 MPa, 623 MPa, 700 MPa, etc.

In this example, the first current collector 21 is a copper foil, which is subdivided into general strength (300-400 MPa), medium strength (400-500 MPa), high strength (500-600 MPa), and ultra-high strength (>600 MPa) copper foils based on the tensile strength of lithium battery copper foils.

The tensile strength of copper foil is affected by both thickness and grain size. When the thickness is constant, the tensile strength increases as the grain size decreases. When the grain size is comparable, the tensile strength is proportional to the thickness. The tensile strength varies in different ranges of thickness to grain size ratio. When the thickness to grain size ratio is small (<4), the tensile strength is proportional to the thickness, while when the ratio is large (>15), the tensile strength is inversely proportional to the thickness.

When the thickness of the copper foil is constant, the tensile strength of the copper foil increases as the grain size decreases. This can be explained by the grain refinement strengthening mechanism: for general polycrystalline materials, the free energy of grain boundaries is very high relative to the interior of the grains, and can be regarded as a potential barrier that hinders dislocation movement. Under the action of external forces, in order to produce shear deformation in adjacent grains, a sufficiently large shear stress must be generated at the grain boundaries.

Tensile strength is closely related to the transfer of slip from plastically deformed grains to adjacent grains. Whether this transfer can occur mainly depends on whether the stress concentration generated by the dislocation pile-up groups near the grain boundaries of the slipped grains can activate the dislocation sources in the slip systems of adjacent grains, enabling them to start and perform coordinated multi-slip. Grain refinement can produce more grain boundaries. If the structure of the grain boundaries does not change, a greater external force needs to be applied to generate dislocation pile-ups, thereby strengthening the material.

A large number of research analyses have found that a series of additives can be added during the copper foil manufacturing process to optimize the grain size, morphology, orientation, and internal stress of the copper foil, thereby achieving controllable production of high mechanical performance copper foils. By refining grains, selecting appropriate crystal plane textures, and improving solution cleanliness, the tensile strength and elongation of high tensile strength copper foils can be significantly improved.

High tensile strength and high elongation copper foils can improve the coating and rolling efficiency of downstream battery factories, avoid web breaks, and thus improve production efficiency. They can increase the active material loading of the first coating 22, enhance the compaction density of the electrode plate, and reduce the thickness of the electrode plate, thereby improving the energy density of lithium-ion batteries. They can also better inhibit partial deformation caused by the expansion and contraction of active materials during electrochemical cycles, thereby improving battery durability.

In one possible embodiment, the thickness c of the first current collector 21 satisfies a follow condition: 1 µm≤c≤15 µm. Exemplarily, the thickness c of the first current collector 21 can be 1 µm, 10 µm, or 15 µm.

In one possible embodiment, the thickness c of the first current collector 21 satisfies a follow condition: 3 µm≤c≤7 µm. Exemplarily, the thickness c of the first current collector 21 can be 3 µm, 6.6 µm, 4 µm, 4.7 µm, 5 µm, 5.5 µm, 6 µm, 6.3 µm, 7 µm, etc.

It is easy to understand that if the thickness c of the first current collector 21 is too small, it will affect the tensile strength of the first current collector 21, which in turn will adversely affect the inhibition of the extension of the first coating 22. Conversely, if the thickness c of the first current collector 21 is too large, it will affect the energy density of the battery. Therefore, in this application, by making the thickness c of the first current collector 21 satisfy a follow condition: 3 µm≤c≤7 µm, it is possible to achieve a certain inhibitory effect on the extension of the first coating 22, and may also ensure the energy density of the battery.

The first current collector 21 is a copper foil, and the elongation performance of the first current collector 21 needs to be analyzed in conjunction with the actual thickness of the first current collector 21. The elongation of the first current collector 21 mentioned in this article is mainly based on the standards of downstream lithium battery factories.

Exemplarily, when the thickness c of the copper foil is 6 µm, the conventional elongation of the first current collector 21 is >4%, and the high elongation is >6%; when the thickness is 8 µm, the conventional elongation is >5%, and the high elongation is >8%.

In one possible embodiment, the thickness of the first current collector 21 ranges from 1 µm to 15 µm.

In one possible embodiment, the silicon-based material in the first coating 22 comprises at least one silicon-oxygen material, and the chemical formula of the silicon-oxygen material is MySiOx, where 0≤y≤4, 0≤x≤4, and M comprises at least one of Li, Mg, Ti, and Al.

Wherein, the silicon-oxygen material comprises magnesium silicate compounds such as MgSiO3, or magnesium silicate compounds such as MgSiO3 and Mg2SiO4.

In the first coating 22, the higher the content of the silicon-oxygen material, the more beneficial it is for increasing the capacity of the battery.

In one possible embodiment, the punching depth H of the film casing 10 during the stamping process is 2 mm to 5.5 mm.

In one possible embodiment, the punching depth of the film casing 10 during the stamping process can be 2, 2.8, 3, 3.4, 4, 4.2, or 5.

The present disclosure provides a battery cell, which further comprises a positive electrode plate and a negative electrode plate 20 arranged in a stacked manner, with a separator provided between the positive electrode plate and the negative electrode plate 20.

The positive electrode plate comprises a second current collector and a second coating provided on the surface of the second current collector, and the second coating comprises one or more of lithium cobalt oxide, ternary material, lithium iron phosphate, lithium manganese oxide, and lithium titanate.

The present application further provides a battery, which comprises a housing and the battery cell, with the battery cell being disposed inside the housing. In one embodiment of the battery provided in the present application, the number of battery cells can be one, two, three, or more, which is not specifically limited here.

In order to verify that the improvements of the present application can effectively reduce the problem of corner cracks at the vertex 11 and improve the energy density and safety of the battery cell, the following experiments were conducted for testing. The following are the test data of specific embodiments.

Example 1

In this example, the battery cell can be manufactured by the following method.

Preparing a negative electrode coating slurry: specifically, using artificial graphite and silicon-carbon material as the negative electrode active materials, conductive carbon black as the conductive agent, styrene-butadiene rubber as the binder, and sodium carboxymethyl cellulose as the thickener, respectively, they are added to a mixing tank in a mass ratio of 96.9:1.5:1.3:13. Deionized water solvent is added into the mixing tank, and the mixture is fully stirred according to the existing batching process and filtered through a 150-mesh sieve to prepare the negative electrode coating slurry with a solid content of 40% to 45%.

Preparing a negative electrode plate 20: the above-mentioned negative electrode coating slurry is applied onto the surface of the first current collector 21 using a coating machine to form the first coating 22. The first current collector 21 is a copper foil. Then, it is dried at a temperature of 100° C. to prepare an initial negative electrode plate. The initial sheet is cut according to actual needs to prepare the negative electrode plate. The total weight S1 of the silicon-based material and the weight S2 of the first coating is are 17.749 g, with the weight S1 being 1.7749 g. Preparing a positive electrode coating slurry: specifically, using lithium cobalt oxide as the positive electrode active material, it is added to a mixing tank together with a conductive agent and polyvinylidene fluoride in a mass ratio of 97.2:1.5:1.3. NMP solvent is added, and the mixture is fully stirred according to the existing batching process and filtered through a 200-mesh sieve to prepare the positive electrode slurry with a solid content of 70% to 75%.

Preparing a positive electrode plate: the above-mentioned positive electrode coating slurry is applied onto the surface of the second current collector using a coating machine to form the second coating. The second current collector is an aluminum foil current collector. Then, it is dried at a temperature of 120° C. to prepare an initial positive electrode plate. The initial sheet is cut according to actual needs to prepare the positive electrode plate.

Assembling the battery cell: the above-mentioned positive electrode plate, negative electrode plate, and separator together are wrapped to form a jelly roll, and it is encapsulated with aluminum-plastic film. The punching depth H of the aluminum-plastic film during the stamping process is 4.0 to 4.5 mm. After baking to remove moisture, electrolyte is injected, and the battery cell is obtained through a hot pressing formation process.

In Example 1, the first current collector 21 is a copper foil, the OI value a of graphite in the first coating 22 is 15; the tensile strength b of the first current collector 21 is 300 MPa; the thickness c of the first current collector 21 is 4 μm; Wa is 4; Wb is 1; and Wc is 6. The calculated value of $(abc)/(Wa \times Wb \times Wc)$ is 3000, and $a^2bc/10000$ is 27.

In an environment of 45° C., the battery cell is tested for 1000 cycles according to the charge-discharge method specified in the battery specification, i.e., the battery cell is charged and discharged for 1000 cycles, and the damage of the battery cell is counted.

Example 2

Example 2 differs from Example 1 in that Wa is 2, and the rest are the same as in Example 1.
The calculated value is: $(abc)/(Wa \times Wb \times Wc)=1500$, and $a^2bc/10000=27$.

Example 3

Example 3 differs from Example 1 in that Wa is 2, Wb is 3, and Wc is 3, and the rest are the same as in Example 1.
The calculated value is: $(abc)/(Wa \times Wb \times Wc)=1000$, and $a^2bc/10000=27$.

Example 4

Example 4 differs from Example 1 in that the OI value a of graphite in the first coating 22 is 28, Wa is 2, and Wb is 3, and the rest are the same as in Example 1.
The calculated value is: $(abc)/(Wa \times Wb \times Wc)=933.33$, and $a^2bc/10000=94.08$.

Example 5

Example 5 differs from Example 1 in that the tensile strength b of the first current collector 21 is 450 MPa, Wa is 2, and Wb is 3, and the rest are the same as in Example 1.
The calculated value is: $(abc)/(Wa \times Wb \times Wc)=750$, and $a^2bc/10000=40.50$.

Example 6

Example 6 differs from Example 1 in that the thickness c of the first current collector 21 is 7 μm, Wa is 2, Wb is 3, and Wc is 6, and the rest are the same as in Example 1.
The calculated value is: $(abc)/(Wa \times Wb \times Wc)=875$, and $a^2bc/10000=47.25$.

Example 7

Example 7 differs from Example 1 in that the OI value a of graphite in the first coating 22 is 30, the tensile strength b of the first current collector 21 is 700 MPa, the thickness c of the first current collector 21 is 6 μm, Wa is 1, Wb is 1, and Wc is 1.5, and the rest are the same as in Example 1.
The calculated value is: $(abc)/(Wa \times Wb \times Wc)=84000$, and $a^2bc/10000=378$.

Comparative Example 1

Comparative Example 1 differs from Example 1 in that the OI value a of graphite in the first coating 22 is 15, the tensile strength b of the first current collector 21 is 300 MPa, the thickness c of the first current collector 21 is 4 μm, Wa is 2, Wb is 3, and Wc is 6. The calculated value is: $(abc)/(Wa \times Wb \times Wc)=500$, and $a^2bc/10000=27$.

In Comparative Example 1, the negative electrode plate 20 has a large degree of extension, which compresses the film casing 10, easily causing the problem of corner crack at the vertex 11.

Comparative Example 2

Comparative Example 1 differs from Example 1 in that the OI value a of graphite in the first coating 22 is 8, the tensile strength b of the first current collector 21 is 300 MPa, the thickness c of the first current collector 21 is 4 μm, Wa is 2, Wb is 2, and Wc is 6. The calculated value is: (abc)/(Wa×Wb×Wc)=400, and $a^2bc/10000$=7.68.

In Comparative Example 2, the negative electrode plate 20 has a large degree of extension, which compresses the film casing 10, easily causing the problem of corner crack at the vertex 11.

Testing methods are shown as below.

Testing Method for OI Value a of Graphite: the OI value of the powder of the negative electrode active material and the OI value of the graphite in the first coating 22 (i.e., the OI value of the negative electrode film layer), can be obtained by using an X-ray powder diffractometer (X'pert-PRO). The X-ray diffraction pattern is obtained according to the General Rules for X-ray Diffraction Analysis Methods and the Lattice Parameter Measurement Method for Graphite JIS K0131-1996, JB/T4220-2011. The OI value is calculated as C004/C110, wherein C004 is the peak area of the 004 characteristic diffraction peak, and C110 is the peak area of the 110 characteristic diffraction peak.

until it breaks. The maximum load F is read from the force measuring dial or the tensile curve, and the absolute tensile strength is calculated as σ=F/L, wherein L is the width of the sample to be tested. The arithmetic mean value of the test results of 3-5 specimens is taken to obtain the absolute tensile strength of the sample to be tested.

Testing Method for Elongation Rate: the electrode plate is disassembled in a fully charged state, and the width T of the electrode plate is tested and recorded. The designed width of the electrode plate is T1. The elongation rate is calculated as (T−T1)/T1×100%.

Five battery cells from each of Examples 1 to 7 and five battery cells from each of Comparative Examples 1 and 2 are taken and subjected to a 1000 CYCLE cycle test in an environment of 45° C. according to the battery specification charging and discharging method, i.e., the battery cells are charged and discharged 1000 times, and the damage of the battery cells is counted. The experimental results are shown in Table 1.

TABLE 1

| Item | Graphite OI value (a) | Copper foil tensile strength (b)(MPa) | Copper foil thickness (c)(μm) | Wa | Wb | Wc | (abc)/(Wa × Wb × Wc) | $a^2bc/1000$ | 1000T Impact damage condition |
|---|---|---|---|---|---|---|---|---|---|
| comparative example 1 | 15 | 300 | 4 | 2 | 3 | 6 | 500 | 27 | 3/5 |
| comparative example 2 | 8 | 300 | 4 | 2 | 2 | 6 | 400 | 7.68 | 4/5 |
| example 1 | 15 | 300 | 4 | 1 | 1 | 6 | 3000 | 27 | 0/5 |
| example 2 | 15 | 300 | 4 | 2 | 1 | 6 | 1500 | 27 | 0/5 |
| example 3 | 15 | 300 | 4 | 2 | 3 | 3 | 1000 | 27 | 0/5 |
| example 4 | 28 | 300 | 4 | 2 | 3 | 6 | 933.33 | 94.08 | 0/5 |
| example 5 | 15 | 450 | 4 | 2 | 3 | 6 | 750 | 40.5 | 0/5 |
| example 6 | 15 | 300 | 7 | 2 | 3 | 6 | 875 | 47.25 | 0/5 |
| example 7 | 30 | 700 | 6 | 1 | 1 | 1.5 | 84000 | 378 | 0/5 |

Specifically, the testing method for the powder OI value of the negative electrode active material is shown as follows: a certain mass of the negative electrode active material powder is placed in the X-ray powder diffractometer, and the peak areas of the 004 and 110 crystal plane diffraction peaks are obtained by X-ray diffraction analysis to further obtain the powder OI value of the negative electrode active material particles. Specifically, the testing method for the OI value of the graphite in the first coating 22, i.e., the OI value of the negative electrode film layer, is shown as follows: the prepared negative electrode plate is directly placed in the X-ray powder diffractometer, and the peak areas of the 004 and 110 crystal plane diffraction peaks are obtained by X-ray diffraction analysis to further obtain the OI value of the negative electrode film layer.

Testing Method for Tensile Strength and Thickness of Copper Foil: a tensile testing machine with a range of 0N to 1000N and an indication error of +1% is used, as well as a vernier caliper with a range of 0 mm to 300 mm and a minimum division value of 0.02 mm or a measuring tool with corresponding accuracy. The sample to be tested is cut to a length of 200±0.5 mm and a width of 15±0.25 mm. The sampling position is taken at two positions along the longitudinal and transverse directions at the upper edge of the width direction of the sample to be tested. Subsequently, the sample to be tested is placed in the tensile testing machine, with a grip distance of 125±0.1 mm, a grip tensile speed of 50 mm/min, and a test temperature of 20±10° C. The sample to be tested is continuously loaded in the length direction By comparing Examples 1 to 3 with Comparative Examples 1 and 2, it is illustrated that Wa, Wb, and Wc can enhance the angular position space, providing allowance for elongation and effectively preventing rupture.

Comparing Example 4 with Comparative Examples 1 and 2 demonstrates that reducing the graphite OI value can effectively control elongation.

Comparing Examples 5 and 6 with Comparative Examples 1 and 2 shows that increasing the copper foil thickness/tensile strength can effectively control elongation.

It should be noted that the numerical values and ranges mentioned in this application are approximate values, and due to the influence of the manufacturing process, there may be a certain range of errors, which can be considered negligible by those skilled in the art.

In the description of this disclosure, it should be understood that the terms "center", "length", "width", "thickness", "top", "bottom", "upper", "lower", "left", "right", "front", "rear", "vertical", "horizontal", "inner", "outer", "axial", "circumferential", etc., indicating orientation or positional relationships, are based on the orientation or positional relationships shown in the drawings, and are merely for the purpose of facilitating the description of the disclosure and simplifying the description, rather than indicating or implying that the positions or components referred to must have a specific orientation, configuration, or operation, and therefore should not be construed as limiting the disclosure.

Furthermore, the terms "first" and "second" are used for descriptive purposes only and are not to be construed as indicating or implying relative importance or implicitly specifying the number of technical features indicated. Thus, features defined with "first" and "second" may explicitly or implicitly comprise one or more of such features. In the description of this disclosure, the meaning of "a plurality of" is at least two, such as two, three, etc., unless otherwise explicitly and specifically defined.

In this disclosure, unless otherwise explicitly specified and defined, terms such as "mounted," "connected," "attached," and "fixed" should be interpreted in a broad sense. For example, they may refer to fixed connections, detachable connections, or integral formations; they may refer to mechanical connections, electrical connections, or mutual communication; they may refer to direct connections or indirect connections through intermediate media; and they may refer to internal communication between two components or interaction relationships between two components. For those skilled in the art, the specific meanings of the terms in this disclosure can be understood based on specific circumstances.

In this disclosure, unless otherwise explicitly specified and defined, the "on" or "under" of a first feature relative to a second feature may comprise direct contact between the first feature and second feature, or may comprise contact between the first feature and second feature not being direct but through additional features therebetween. Moreover, the "on," "above," and "over" of a first feature relative to a second feature comprise the first feature being directly above or diagonally above the second feature, or simply indicate that the horizontal height of the first feature is higher than that of the second feature. The "under," "below," and "beneath" of a first feature relative to a second feature comprise the first feature being directly below or diagonally below the second feature, or simply indicate that the horizontal height of the first feature is less than that of the second feature.

Finally, it should be noted that: the foregoing examples are provided solely to illustrate the technical solutions of this disclosure, rather than to limit them. Although this disclosure has been described in detail with reference to the foregoing examples, it should be understood by those skilled in the art that modifications to the technical solutions described in the foregoing examples or equivalent substitutions of some or all of the technical features therein may still be made, and such modifications or substitutions do not cause the essence of the corresponding technical solutions to deviate from the scope of the technical solutions of the examples of this disclosure.

What is claimed is:

1. A battery cell, comprising:
a battery cell body and a film casing, the film casing being wrapped around an exterior of the battery cell body, the battery cell body comprising a negative electrode plate, the negative electrode plate comprising a first current collector and a first coating, the first coating comprising graphite, the film casing having a plurality of vertices, each vertex comprising a first edge corner portion, a second edge corner portion, and a third edge corner portion intersected; the film casing and the battery cell body satisfy a follow condition: 750 N/μm≤(abc)/(Wa×Wb×Wc)≤90000 N/μm;
wherein, Wa=Ka/H; Wb=Kb/H; Wc=Kc/H, Ka being a reversal parameter of the first edge corner portion measured in the unit of millimeter (mm); Kb being a reversal parameter of the second edge corner portion measured in the unit of millimeter (mm); Kc being a reversal parameter of the third edge corner portion measured in the unit of millimeter (mm); H being a punching depth of the film casing measured in the unit of millimeter (mm); a being an OI value of the graphite in the first coating without a unit of measure; b being a tensile strength of the first current collector measured in the unit of megapascal (MPa); c being a thickness of the first current collector measured in the unit of micrometer (μm).

2. The battery cell according to claim 1, wherein the OI value a of the graphite in the first coating, the tensile strength b of the first current collector, and the thickness c of the first current collector satisfy a follow condition: 20 N/μm≤a²bc/10000 N/μm.

3. The battery cell according to claim 1, wherein the film casing comprises a top wall and a plurality of side walls connected to edges of the top wall, the plurality of side walls comprising a first side wall and a second side wall adjacent to each other, a connection position between the top wall and the first side wall forming the first edge corner portion, a connection position between the top wall and the second side wall forming the second edge corner portion, and a connection position between the first side wall and the second side wall forming the third edge corner portion;
wherein, a ratio Wa between the reversal parameter of the first edge corner portion and the punching depth of the film casing, a ratio Wb between the reversal parameter of the second edge corner portion and the punching depth of the film casing, and a ratio Wc between the reversal parameter of the third edge corner portion and the punching depth of the film casing further satisfy a follow condition:

$$Wa \leq Wc, Wb \leq Wc, 1 \leq Wa \leq 8, 1 \leq Wb \leq 8, \text{ and } 1 \leq Wc \leq 8.$$

4. The battery cell according to claim 1, wherein the first coating further comprises a silicon-based material, and a ratio of a weight S1 of the silicon-based material to a weight S2 of the first coating satisfies a follow condition: 0≤S1/S2≤20%.

5. The battery cell according to claim 4, wherein the silicon-based material in the first coating comprises at least one silicon-oxygen material, and a chemical formula of the silicon-oxygen material is $M_ySiO_x$, wherein 0≤y≤4, 0≤x≤4, and M comprises at least one of Li, Mg, Ti, and Al.

6. The battery cell according to claim 1, wherein the OI value a of the graphite in the first coating satisfies a follow condition: 8≤a≤30.

7. The battery cell according to claim 1, wherein:
the tensile strength b of the first current collector satisfies a follow condition: 300 MPa≤b≤700 MPa;
the thickness c of the first current collector satisfies a follow condition: 1 μm≤c≤15 μm.

8. The battery cell according to claim 7, wherein the thickness c of the first current collector satisfies a follow condition: 3 μm≤c≤7 μm.

9. The battery cell according to claim 1, wherein a punching depth H of the film casing during a stamping forming process is 2 mm to 5.5 mm.

10. A battery, wherein it comprises a housing and the battery cell according to claim 1, and the battery cell is disposed inside the housing.

* * * * *